(12) United States Patent
Boehmer et al.

(10) Patent No.: US 9,878,598 B2
(45) Date of Patent: Jan. 30, 2018

(54) WINDSHIELD SETTING SYSTEM

(71) Applicants: Daniel Boehmer, Englewood, CA (US); Christopher Ciccarone, Port Charlotte, FL (US)

(72) Inventors: Daniel Boehmer, Englewood, CA (US); Christopher Ciccarone, Port Charlotte, FL (US)

(*) Notice: Subject to any disclaimer, the term of this patent is extended or adjusted under 35 U.S.C. 154(b) by 186 days.

(21) Appl. No.: 14/425,011

(22) PCT Filed: Aug. 31, 2013

(86) PCT No.: PCT/US2013/057745
§ 371 (c)(1),
(2) Date: Feb. 28, 2015

(87) PCT Pub. No.: WO2014/036535
PCT Pub. Date: Mar. 6, 2014

(65) Prior Publication Data
US 2015/0197137 A1    Jul. 16, 2015

Related U.S. Application Data

(60) Provisional application No. 61/695,766, filed on Aug. 31, 2012.

(51) Int. Cl.
*B60J 1/00* (2006.01)
*B25B 11/02* (2006.01)
(Continued)

(52) U.S. Cl.
CPC ............. *B60J 1/005* (2013.01); *B25B 11/007* (2013.01); *B25B 11/02* (2013.01);
(Continued)

(58) Field of Classification Search
CPC . B23Q 3/105; F16L 3/18; B25B 11/02; B25B 27/0035; B60J 1/005
(Continued)

(56) References Cited

U.S. PATENT DOCUMENTS 3,130,103 A * 4/1964 Mattimoe ................. B60R 1/04
156/391
4,561,689 A * 12/1985 Sprenger ................. B60J 1/005
29/240

(Continued)

FOREIGN PATENT DOCUMENTS

FR        002940932 A1 * 1/2009

OTHER PUBLICATIONS

Rolladeck websiteand YouTube pictures.*

*Primary Examiner* — Larry E Waggle, Jr.
*Assistant Examiner* — Mahdi H Nejad
(74) *Attorney, Agent, or Firm* — Bennett Intellectual Property; Allen F. Bennett

(57) ABSTRACT

A device for facilitating the removal and installation of a windshield by a single technician without use of heavy equipment includes a base plate, a slide plate and a deck plate. The base plate may be secured to a wiper blade post. The slide plate is secured to the base plate and may be slidably adjusted to a desired position. A deck plate may be secured to the slide plate. The deck plate has a roller or other channel within which the edge of windshield may easily slide in order to position the windshield and support most of its weight as it is manipulated by a technician.

19 Claims, 5 Drawing Sheets

(51) Int. Cl.
*B25B 11/00* (2006.01)
*B25B 27/00* (2006.01)

(52) U.S. Cl.
CPC ..... *B25B 27/0035* (2013.01); *Y10T 29/49902* (2015.01); *Y10T 29/49998* (2015.01); *Y10T 29/53961* (2015.01)

(58) Field of Classification Search
USPC ..... 269/296, 191, 289 MR, 71; 248/55, 208, 248/430, 128, 132; 29/724; 81/57.15, 81/57.18, 578, 33; 296/201, 96.21, 95, 296/97.11, 26.09, 26.05, 100.03, 216.04, 296/26.15
See application file for complete search history.

(56) References Cited

U.S. PATENT DOCUMENTS

| | | | |
|---|---|---|---|
| 4,643,477 A | 2/1987 | Kovatch | |
| 4,700,919 A * | 10/1987 | Saunders, IV | B60J 1/005 |
| | | | 248/288.31 |
| 4,938,521 A * | 7/1990 | Kunert | B32B 17/10036 |
| | | | 156/108 |
| 5,013,077 A * | 5/1991 | Stevens | B60J 1/005 |
| | | | 296/96.21 |
| 5,308,135 A * | 5/1994 | Stedman | B60J 1/005 |
| | | | 296/201 |
| 5,337,875 A * | 8/1994 | Lee | B65G 13/12 |
| | | | 193/35 C |
| 5,531,496 A * | 7/1996 | Zbinden | B60J 1/005 |
| | | | 296/201 |
| 5,772,823 A | 6/1998 | Rusch et al. | |
| 5,956,833 A * | 9/1999 | Davis | B60J 10/45 |
| | | | 269/138 |
| 6,099,063 A * | 8/2000 | Rohagti | B60J 10/45 |
| | | | 296/201 |
| 7,039,995 B2 | 5/2006 | Thompson | |
| 7,207,555 B2 * | 4/2007 | Valentin | B21C 37/06 |
| | | | 248/132 |
| 8,196,356 B2 * | 6/2012 | Allen | B60J 1/08 |
| | | | 296/146.2 |
| 8,733,747 B2 * | 5/2014 | Glikis | B60J 1/005 |
| | | | 269/104 |
| 2003/0230839 A1 * | 12/2003 | Ursell | B23Q 3/105 |
| | | | 269/289 MR |
| 2005/0121936 A1 * | 6/2005 | Kennett | B60J 1/005 |
| | | | 296/96.21 |
| 2006/0156533 A1 | 7/2006 | Mayhugh | |
| 2007/0062020 A1 | 3/2007 | Mayhugh | |
| 2007/0108790 A1 | 5/2007 | Adas et al. | |
| 2007/0228765 A1 | 10/2007 | Lee | |
| 2011/0049316 A1 * | 3/2011 | Vitoorapakorn | B60J 7/1621 |
| | | | 248/226.11 |
| 2015/0251522 A1 * | 9/2015 | Glikis | B60J 1/005 |
| | | | 296/96.21 |
| 2016/0068137 A1 * | 3/2016 | Bender | B60J 1/008 |
| | | | 296/96.17 |

* cited by examiner

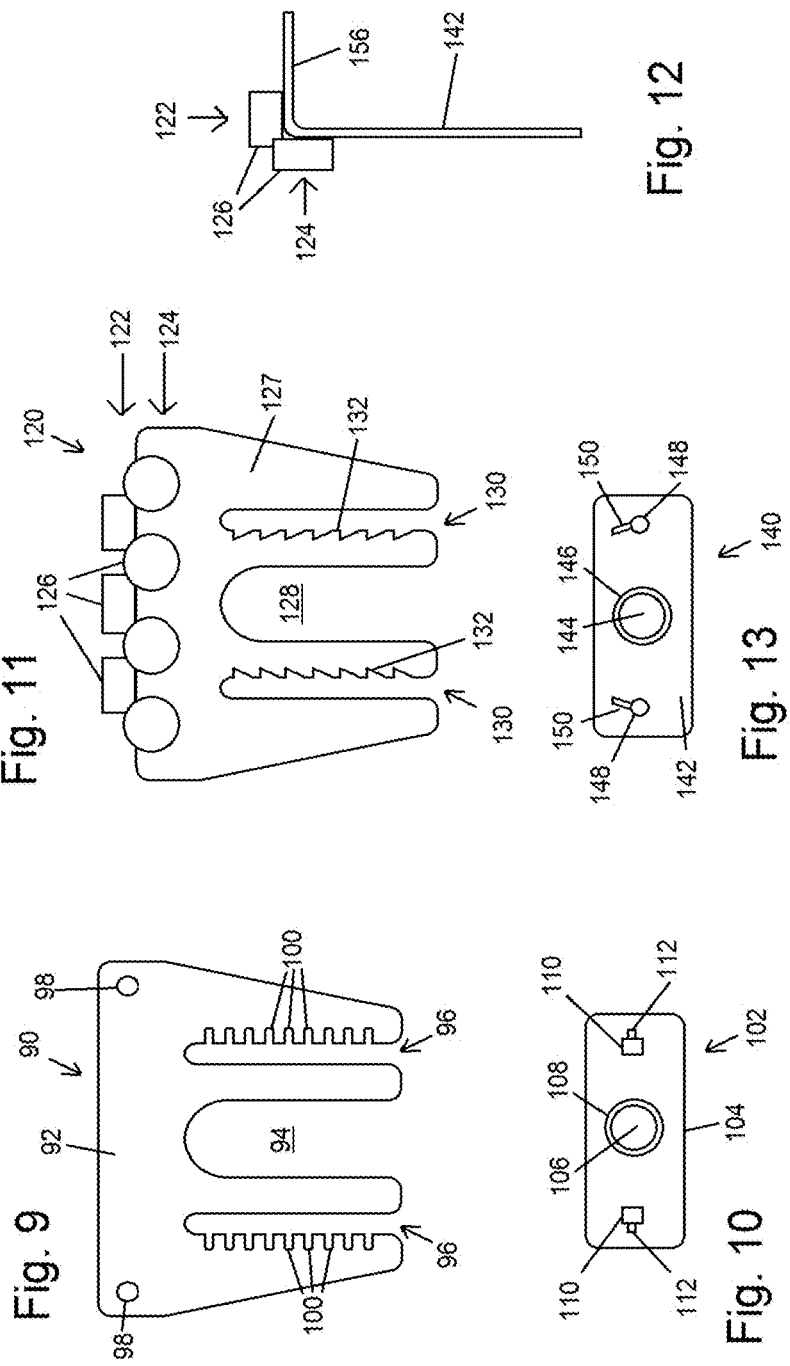

WINDSHIELD SETTING SYSTEM

CROSS-REFERENCE TO RELATED APPLICATIONS

This application claims priority to U.S. Provisional Application Ser. No. 61/695,766, filed Aug. 31, 2012, the contents of which are hereby incorporated in their entirety.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of Endeavor

The present invention relates to systems and methods for positioning a replacement windshield on a vehicle. More particularly, the invention relates to a device and system for allowing a single operator to precisely and accurately position a replacement windshield on an automobile.

Background Information

Automobile windshields are typically comprised of a single large pane of glass precisely shaped and configured for a particular make and model of car. When a windshield is damaged beyond repair. It must be replaced. This may be a difficult procedure as windshields are typically heavy. A new windshield must also be placed precisely on the automobile. It is often impractical to use large machinery to assist in positioning the windshield.

The removal and installation of windshields on vehicles is usually accomplished by hand with the windshield being handled with suction cups that hold the glass while it is being removed or placed on the vehicle. Large windshields are not easily handled especially in utility vehicles and trucks. Both removing a damaged windshield, and aligning and positioning a new windshield are often a two-person job. Windshield repair is a highly competitive industry and it is therefore desirable to keep costs to a minimum.

Auto Glass Technicians are faced with challenges every day. In order to be productive, they must quickly complete a multitude of service calls while meeting a strict standard of quality of work performed. Time is of the essence for the Mobil Auto Glass Technician. To meet these challenges, the technician often would have to sacrifice their body and/or the quality of the installation to meet the day's workload. This "Sacrifice" for speed has cost the industry and the individual technicians an incalculable amount through personal injury, workmen's comp claims and crash worthiness liability claims.

In view of the foregoing, there is a need for a practical means for removing a damaged windshield and installing a replacement windshield on an automobile that may be performed by one person. It is therefore desirable to provide a system of tools or devices that allow a single person to install a windshield without use of heavy or large equipment.

BRIEF SUMMARY OF THE INVENTION

Accordingly, the primary object of the present invention is to allow a technician to safely handle a windshield during both the removal and installation process.

A kit in accordance with the principles of the invention comprises of three basic components, all precision machined from high quality anodized aluminum or the like. These components are 1. the deck plate, 2. slide plates and 3. base plates. The deck plate incorporates a cross link roller design which provides a secure rolling channel for the windshield to travel in. The rollers are made from high quality sealed ball bearings insulated with closed end rubber wheels. The slide plates come in four sizes to accommodate tight clearances as well as wide spans. The slide plates easily bolt onto the deck plate either conventionally or with a drop down configuration to address elevation as needed.

There are six different base plates all color coded for easy identification. Small, medium and large conical bolt on type post, ⅝" and 1" clip on style post with nylon set screw and one offset medium bolt on conical for applications where the wiper post is not perpendicular to the windshield. All base plates are equipped with two sets of threaded holes to enable reversing as needed for clearances or reach etc.

Each kit comes with a hardware kit that includes all screws, spacers and allen wrenches needed along with a handy tool bag with room for accessories. When used correctly, the windshield setting system should provide the user with years of service as the tool requires very little maintenance.

In greater detail, the invention provides a means to assist a single technician in removing and installing a windshield on a vehicle. A series of rollers may be temporarily affixed to the vehicle and used to support the windshield as it is position correctly by the technician During removal, once the old windshield is cut free, the device may be mounted to the passenger-side windshield wiper post, adjusted, and set beneath the old windshield. This may ensure proper adjustment for fit and allow for a safe extraction of the old windshield.

Once the windshield opening has been prepared, and fresh adhesive has been applied, the new windshield may be installed by extending the windshield over to the device and allowing the windshield to rest on the roller channel. Once the windshield is in contact with the device and positioned in the roller channel, the technician may have better control of the windshield. The technician may then glide the windshield into place without disturbing any fresh adhesive or bedding used to seal the windshield in place. Once the windshield is resting at the top of the windshield opening, a technician may secure the windshield using tape to prevent slipping. The technician may then lift the windshield out of the roller channel, remove the device and complete setting the windshield.

It is therefore an object of the present invention to provide a windshield removal and installation tool that allows a single technician to efficiently and inexpensively complete the entire windshield replacement process.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 9 is a top plan view of an alternative embodiment of a slide plate in accordance with the principles of the invention;

FIG. 10 is a top plan view of an alternative embodiment of a base plate in accordance with the principles of the invention;

FIG. 11 is a top plan view of an alternative embodiment of a slide plate in accordance with the principles of the invention;

FIG. 12 is a side view of the alternative embodiment of the slide plate in accordance with the principles of the invention;

FIG. 13 is a top plan view of an alternative embodiment of a base plate in accordance with the principles of the invention.

DETAILED DESCRIPTION

Figure 1:
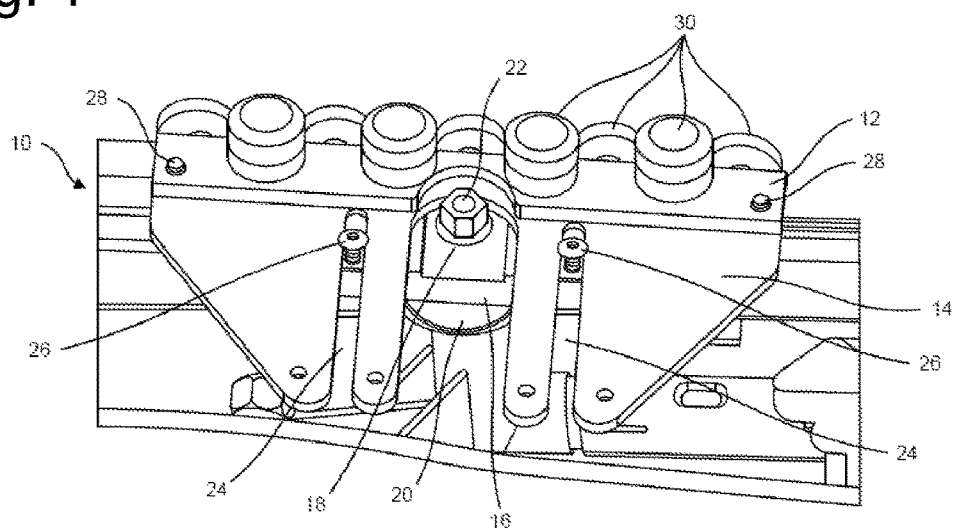
FIG. 1 is a perspective top view of a windshield setting system in accordance with the principles of the invention.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Disclosed is a windshield setting system that may provide a solid platform which may function as a stop or setting block which suspends the windshield above the windshield opening in order for the user to glide the windshield over the opening, and precisely place it into the windshield bed, often comprised of urethane. The setting system may also be used to safely and easily remove the windshield that is being replaced, preventing injury or damage during removal of the old windshield.

One of the features of the invention is that it uses a windshield wiper post as an anchor to which the setting system may be secured. Windshield wiper posts are typically sturdy and capable of withstanding weight and various forces, including substantial torque force and downward force.

This post may be adequate to support a system of two lines of rollers arranged perpendicular to one another that partially overlap. This provides a linear groove capable of supporting the weight of a windshield while also facilitating sliding motion of the windshield along the axis of the groove with very little friction. The setting system thus acts as a seat or saddle for the windshield that allows side to side adjustment of a windshield's position during placement of a new windshield. It may also be used to support the weight of an old windshield during removal. A slide plate may also be used to adjust the position of the groove relative to the wiper post to which it is anchored.

Using the windshield wiper post as a mounting point, the windshield setting system may be attached to the vehicle and may be ready to use within a short time. This may not only provide a way to correctly place the new windshield, but also a means to easily lift out the old windshield. The setting system may improve the ease of removal and ease of installation. The tool may require access to very little space around the vehicle being serviced. This may be beneficial when replacing a windshield while working in a crowded parking lot or a narrow garage.

FIGS. 1-4 show an embodiment of a windshield setting system 10 in accordance with the principles of the invention. Referring to FIG. 1, a deck plate 12 may be secured to a slide plate 14, which may be engaged with a base plate 16. Base plate 16 may include an aperture 18 sized to accommodate a wiper blade post 20. A bolt 22 may be affixed to the top of the wiper blade post 20 to secure the base plate 16 about the wiper blade post 20 during the removal or installation procedure.

Because wiper blade posts 20 may come in a variety of sizes and shapes, various mechanisms may be employed to ensure that the base plate 16 is secured adequately. For example, the base plate 16 may include one or more interchangeable cuffs or annular rings that may be inserted into the aperture in order to provide secure attachment with wiper blade posts of varying sizes. It may also be desirable to utilize a vice or other means for securing the bolt 22 to the top of the wiper post in order to firmly secure the base plate 16.

The slide plate 14 may include two alignment channels 24 sized to accommodate the stems of screws 26. The screws 26 may engage threaded holes in the base plate 16. The screws 26 may be tightened such that the slide plate 14 may be rigidly secured to the base plate 16. The position of the setting system 10 may be adjusted by changing the positions of the screws 26 within the alignment channels 24. This may allow an operator to adjust the position of the slide plate 14 relative to the windshield being replaced.

In this embodiment, the screws, 26 are designed to be actuated by an Allen wrench. However, the screws 26 may also be designed to be actuated by a Phillips screwdriver, a flathead screwdriver, may include a thumb lock or wingnut design that may be twisted by hand or any other suitable element for engaging the screw in order to apply torque force. Those skilled in the art will appreciate that there are numerous mechanisms for providing adjustment of the slide plate 14 relative to the wiper post. For example, a rack and pinion system having a locking pinion, a pawl and gear system, or the like may allow for adjustment of the groove of the setting system relative to the wiper post.

Deck plate 12 is removably attached to slide plate 14 by attachment screws 28. Deck plate 12 may have a plurality of rollers 30 arranged in 2 rows substantially perpendicular to one another. The space between the two rows of rollers 30 may form a roller channel or groove. Thus, the base plate 16 may be used to engage a wiper blade post 20 and the slide plate may be used to adjust the location of the deck plate 12. When the deck plate 12 is properly positioned, the setting system 10 in accordance with the principles of the invention may be used to remove or install a windshield in a manner that reduces the strain placed upon the technician and simplifies proper placement of the windshield.

Figure 2:
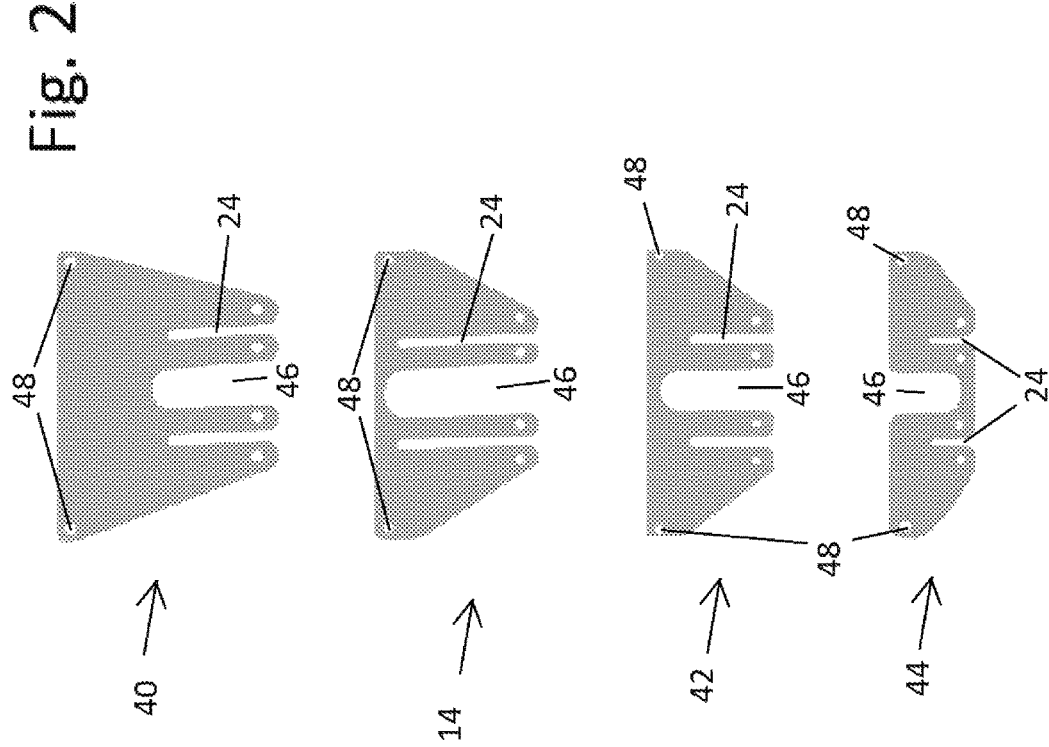
FIG. 2 is a top plan view of slide plates for use with a windshield setting system in accordance with the principles of the invention.

FIG. 2 shows a series of four slide plates having different sizes, extra-large slide plate 40, large slide plate 14 as shown in FIG. 1, medium slide plate 42 and small slide plate 44. The base plates may be made of any sufficiently rigid material and may typically be comprised of a metal alloy. Because each of the slide plates has a different size, their corresponding alignment channels 24 are of different lengths. By providing slide plates having different sizes, a windshield setting system in accordance with the principles of the invention may be used for removing and installing windshields on many different vehicles having different sizes and having wiper blade posts oriented differently in relation to the windshield. Slide plates 40, 14, 42 and 44, in addition to alignment channels 24 also each have a central gap 46 through which the upper portion of a wiper blade post may pass. Each slide plate includes screw holes 48 through which a threaded screw may pass which may allow the slide plate to be secured to the deck plate. Screw holes 48 may or may not be threaded.

Figure 3:
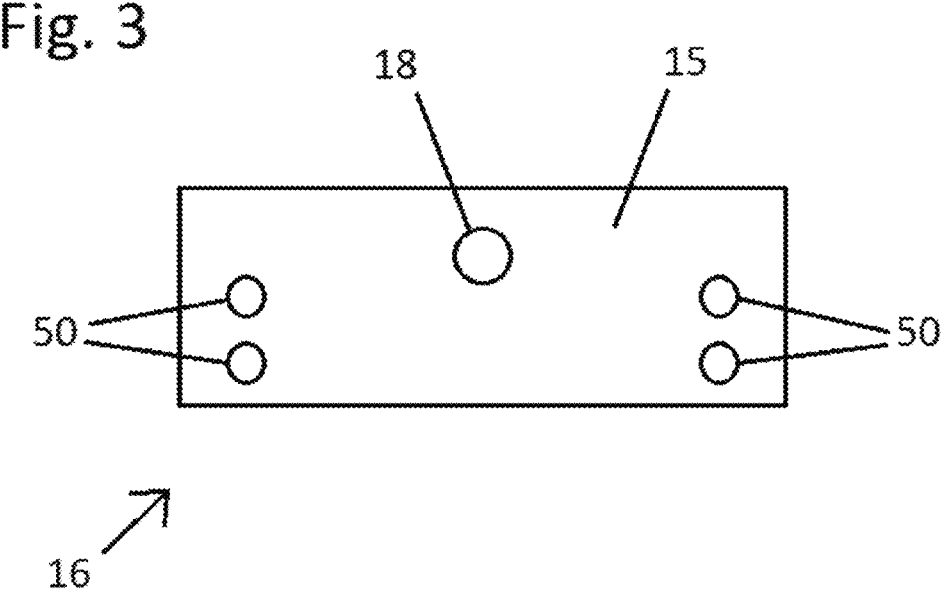
FIG. 3 is a top plan view of a base plate in accordance with the principles of the invention.

FIG. 3 shows a typical base plate 16. Base plate 16 may have a substantially rectangular body 15 and a parallelepiped three-dimensional shape. Base plate 16 may include an aperture 18 through which a wiper blade post may pass. Aperture 18 may be designed to fit snugly about a wiper blade post such that its interior circumference is substantially or partially flush with the outside circumference of the wiper blade post. It may be desirable to provide a plurality of base plates having apertures of varying size. Optionally, a windshield setting system may include a plurality of differently sized cuffs that may be inserted into an aperture 18 in order to accommodate and lie flush with wiper blade posts of varying sizes. The base plate 16 may provide a secure base for a windshield setting system in close proximity to the desired location of a windshield. The base plate 16 may include two or more threaded holes 54 accommodating screws, such as screws 26 in FIG. 1. It may be desirable to have a plurality of base plates having different sizes to accommodate different vehicles.

Slide plate 14 may be affixed to base plate 16 by means of screws through alignment channels 24 and holes 52 with sufficient torque force to create sufficient static friction to hold the slide plate and the base plate substantially rigid and immobile in relation to each other. While in this embodiment, screws 26 may be inserted through holes 48 and readily engaged with holes 50 in order to secure the slide plate 14 to the base plate 16, other methods of secure engagement may be used. The alignment channels 24 of the slide plate 14 allow the positioning and relative orientation of slide plate 14 and base plate 16 to be slidably adjusted in relation to one another. Other mechanisms for affixing a slide plate 14 to a base plate 16 may also be used that may or may not provide for slidable adjustment. A more simplified embodiment of a windshield setting system may utilize a single component that serves the functions of both the slide plate and the base plate. Optionally, only a base plate may be used without a slide plate for adjusting the position of the device 10. For example, a base plate 16 may be enlarged and provided with a means for attaching directly to the deck plate 12.

Figure 4:
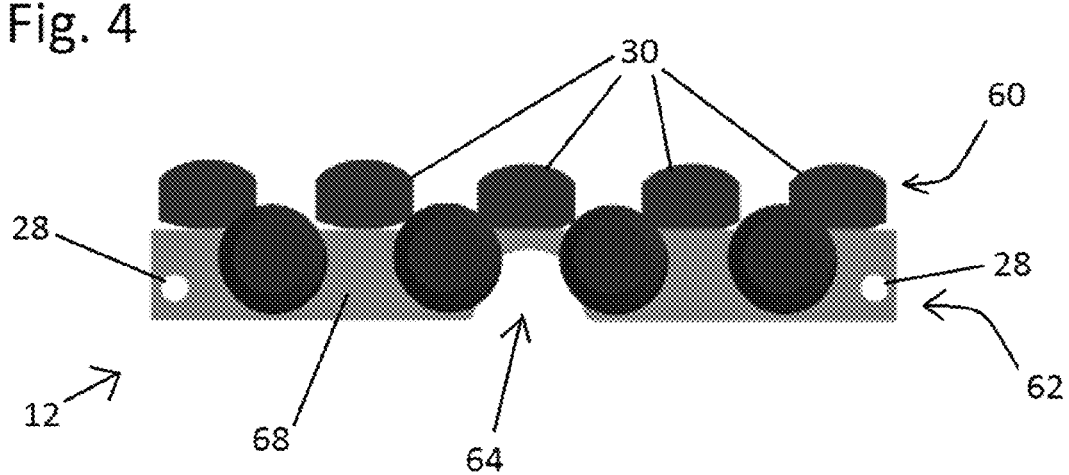
FIG. 4 is a side view of a deck plate in accordance with the principles of the invention.

FIG. 4 shows a deck plate 12 having an elongate body 68, which may be comprised of two rectangular plates substantially perpendicular to each other, thus having a "L" cross section, and supporting a plurality of rollers 30 arranged in two rows 60 and 62 that are also substantially perpendicular to each other. The deck plate may include a gap 64 to provide room for the upper portion of a wiper blade post. The deck plate 12 may also include screw holes 28 that may or may not be threaded and may be used in conjunction with screws or bolts to attach the deck plate 12 to a glide plate 14 or optionally, a base plate 16.

Figure 5:
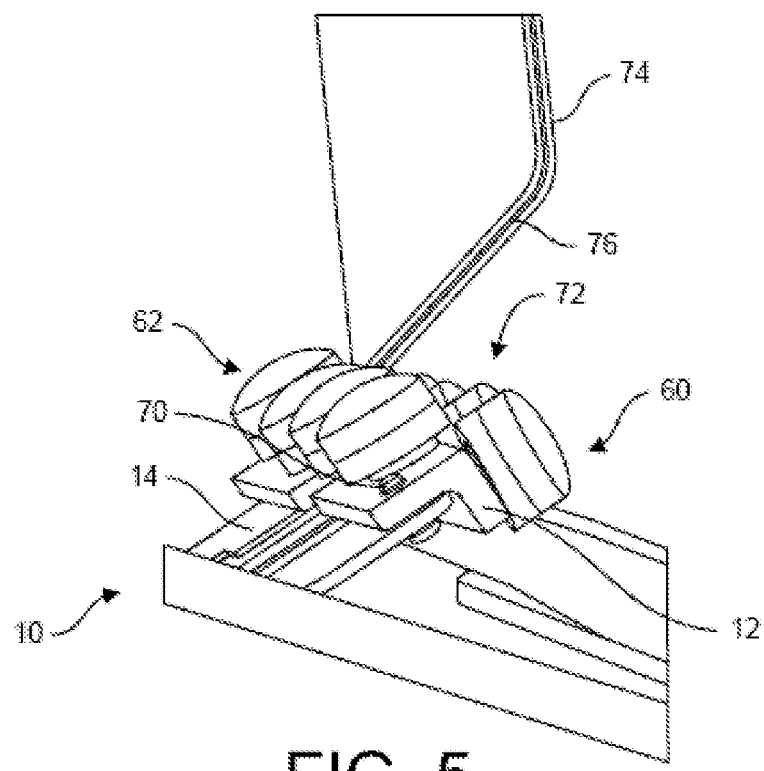
FIG. 5 is an environmental view of a windshield setting system in accordance with the principles of the invention.

FIG. 5 shows a windshield setting system 10 in accordance with principles of the invention being used to support a windshield 74. In this figure, it may be seen that deck plate 12 may have an L-shaped cross-section and rows 60 and 62 of rollers 30 form a roller channel 72. In this embodiment, the rows of rollers 60 and 62 are substantially perpendicular. However it may be desirable for the rows of rollers 60 and 62 to be at lesser or greater angles than 90°. It may also be desirable to use mechanisms other than rollers to create a channel in which a windshield 74 may be supported. For example, a channel may be formed from a plurality of ball bearings, a tank track type of mechanism, or lubricants in a channel. An edge 76 of a windshield 74 may be placed within the roller channel 72, which provides support for the weight of the windshield 74 and allows the windshield to be easily moved longitudinally across the deck plate 12.

Figure 6:
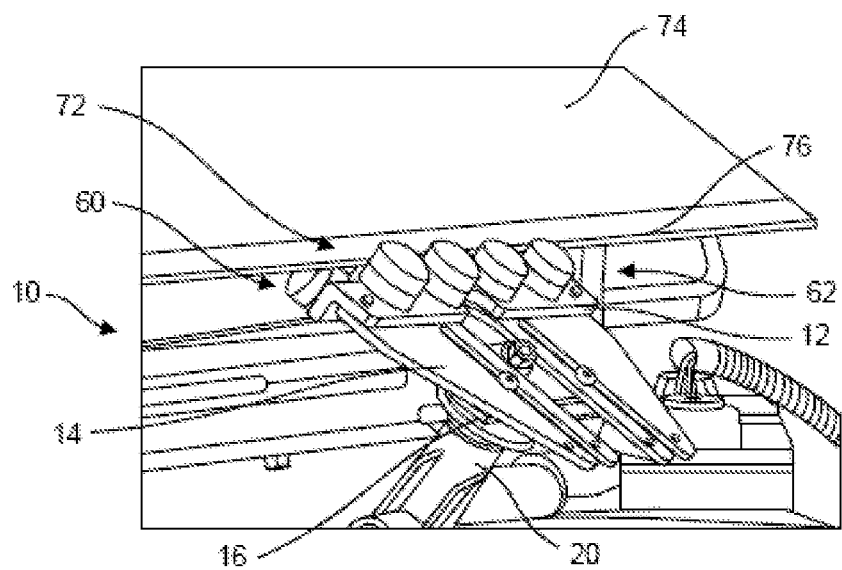
FIG. 6 is another environmental view of a windshield setting system in accordance with the principles of the invention.

FIG. 6 shows the windshield setting system 10 with a windshield 74 supported by it by placing the windshield bottom 76 within the roller channel 72. In this embodiment, row 62 includes 4 rollers while row 60 includes 5 rollers. The rollers of row 62 have axes of rotation that are substantially perpendicular to the axes of rotation of the rollers and row 60. The axes of rotation of rows 60 and 62 may optionally be more or less than 90°. Channel 72 formed by rows 60 and 62 support the bottom 76 of the windshield 74 and allow it to be moved back and forth. This allows the setting system to support most of the weight of the windshield. This makes manipulation of the position of the windshield 74 easier for a single technician.

Figure 7:
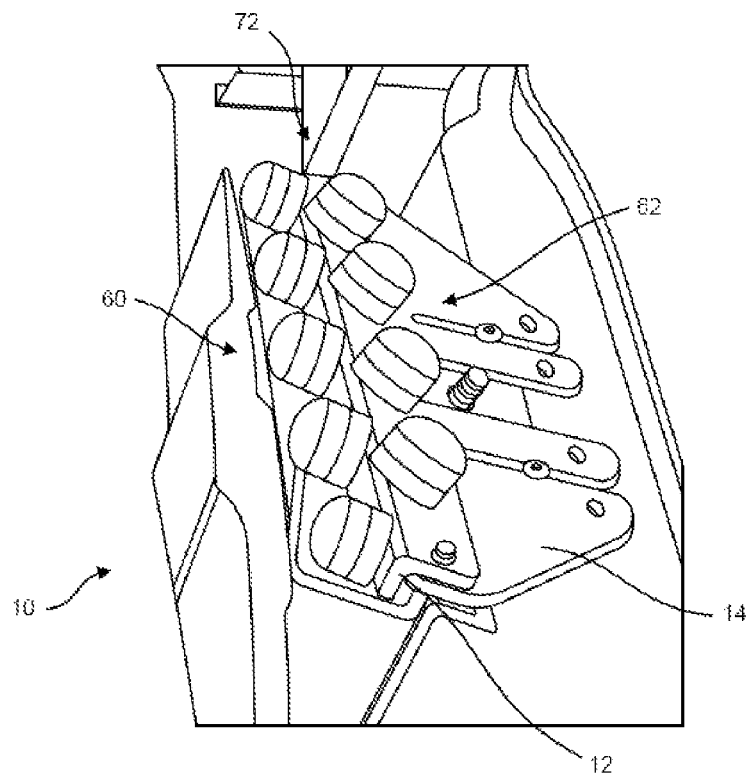
FIG. 7 another environmental view of a windshield setting system in accordance with the principles of the invention.

FIG. 7 shows the setting system 10 when it is not interacting with a windshield. Here it may be seen that the rollers of rows 60 and 62 are offset to one another. As a result, any windshield that traverses channel 72 only comes in contact with the rollers and may not contact the deck plate 12. Slide plate 14 may be adjusted in order to position the roller channel 72 to the optimal place for correctly positioning a windshield.

Figure 8:
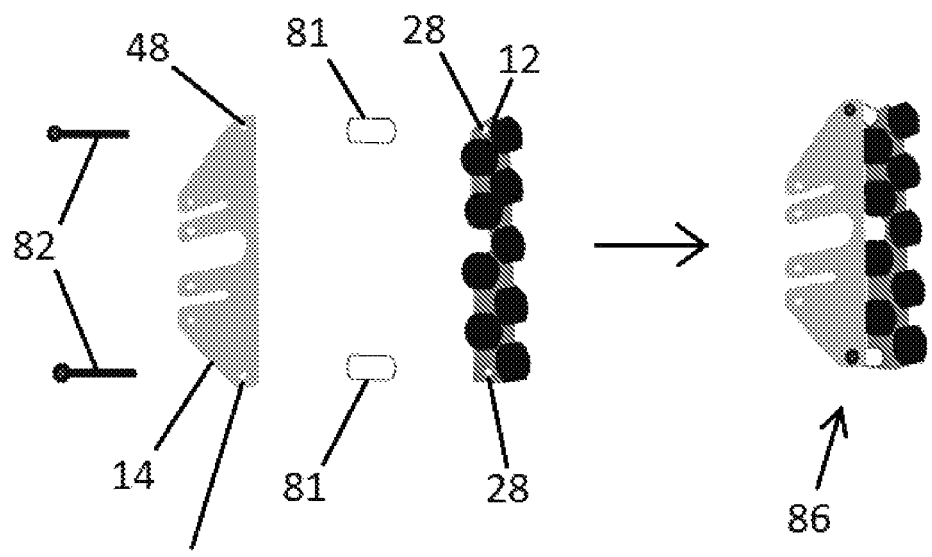
FIG. 8 is a top view of a slide plate and a deck plate with spacers for use with a windshield setting system in accordance with the principles of the invention.

FIG. 8 shows a deck plate 12 and a slide plate 14 in accordance with the principles of the invention and two spacers 81. Spacers 81 may be rigid hollow cylinders through which screws 82 may pass and which allow a technician to increase the distance between the slide plate 14 and the deck plate 12 in order to better position a windshield placed within the roller channel of the deck plate 12. Screws 82 are inserted through holes 48, then through spacers 81, and are finally screwed into holes 28. The resulting configuration 86, what may be referred to as a "drop down" configuration, allows the roller channel that will support the windshield to be positioned further away from the location of the slide plate 14. It may be desirable to provide a plurality of different sized spacers to facilitate placement of the device and even more positions to further ease installation and removal of the windshield.

FIG. 9 shows an alternative embodiment of a slide plate 90 in accordance with the principles of the invention. Slide plate 90 may include a substantially planar body 92. In this embodiment, the body 92 may be substantially trapezoidal. The body 92 may include a gap 94 to accommodate a windshield wiper post. Body 92 may also include one or more screw holes 98 to facilitate removable attachment of a deck plate. In this embodiment, the alignment channels 96 may include a plurality of slots 100 that may be used to secure the slide plate 92 a base plate, as explained in more detail below.

FIG. 10 shows a base plate 102 comprised of a substantially rectangular body 104. The body 104 may include an aperture 106 through which a wiper blade post may be inserted. Once the wiper blade post traverses the aperture 106, a bolt or other device may be attached to the top of the wiper blade post in order to secure attachment. In this embodiment, a spacing ring 108 may be removably inserted into the aperture 106 in order to provide a snug fit between the base plate 102 and they wiper blade post. The spacing ring 108 may be one of several interchangeable spacing rings, each used to accommodate a different size or shape of a wiper blade post.

The base plate 102 may also include one or more tabs 110 designed to fit with in the alignment channels 96. The tabs 110 may each include a retractable tongue 112. The retractable tongues 112 may be pushed inside or lifted upward from tabs 110. To adjust the position of the slide plate 90 relative to the base plate 102, an operator may insert tabs 110 into the alignment channels 96. The tongues 112 may be pushed inward, lifted or otherwise manipulated in order to allow the tabs 110 to freely translates across the length of the alignment channels 96. An operator may move the tabs 110 throughout the alignment channels 96 until the slide plate 90 is in a desired position relative to the base plate 102. An operator may then allow the tongues 112 2 extends into slots 100, thereby securing the slide plate 102 in the desired position.

FIGS. 11 and 12 show another alternative embodiment of a slide plate 120 having an integral deck plate 156. Because the rollers 126 are rotatably affixed to the slide plate 120, a separate deck plate may not be necessary. Rollers 126 form two rows 122 and 124 that may both be substantially linear and substantially parallel to each other. The rollers 126 of rows 122 and 124 may be substantially perpendicular to one another and having axes of rotation substantially perpendicular to those of the other row. Channels 130 may include a series of teeth 132 that may be used to secure the slide plate 120 at a desired position.

FIG. 13 shows another alternative embodiment of a base plate 140. The body 142 of the base plate 140 may have a substantially rectangular shape. An aperture 144 may extend through the base plate 140 and may include one or more spacing rings 146. Tabs 148 may be pivotally attached to the base plate 150, allowing them to rotate. Each of the tabs 148 may also include a pawl 150 that may engage the grooves of the rows of teeth 132. The pawls 150 may be rotated such that they are substantially perpendicular to the channels 130, thereby allowing the slide plate 120 to freely traverse the length of the channel 130. When the slide plate 120 is in a desired location, the pawls 150 may be turned outward to engage the teeth 132. The pawls 150 may optionally be biased by a spring or other mechanism.

In the embodiments shown, nine rollers are used, four in one row and five in the other. It may be desirable to use fewer or more rollers. It may also be desirable to use mechanisms other than screws and/or nuts and bolts to attach the base plate, slide plate and deck plate to one another. As described herein, the device may be utilized generally for placing a windshield on an automobile. However, the device may also be used to remove and install a windshield in an airplane, a boat or other vehicle. Similarly, the base plate is referred to as securely attaching to a wiper blade post. However, the base plate may be used to affix the device to any rigid and secure structure near the object being replaced.

Whereas, the present invention has been described in relation to the drawings attached hereto, it should be understood that other and further modifications, apart from those shown or suggested herein, may be made within the spirit and scope of this invention. Descriptions of the embodiments shown in the drawings should not be construed as limiting or defining the ordinary and plain meanings of the terms of the claims unless such is explicitly indicated.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention claimed is:

1. A windshield setting system comprising a base plate, a convex deck plate and a channel;
   wherein the base plate may be secured to a rigid structure in close proximity to a windshield installation point and may be secured to the convex deck plate;
   wherein the channel is located above the convex deck plate and is defined by two parallel rows of rollers into which a lower edge of a windshield may be placed and is capable of supporting the windshield and facilitating longitudinal movement through the channel by the windshield to properly position the windshield, but does not facilitate movement in a direction transverse to the channel;
   wherein the two parallel rows of rollers forming the channel are offset to each other and partially overlap within the channel in a longitudinal direction along a length of the channel such that the lower edge of the windshield is not capable of coming into to contact with the convex deck plate; and,
   wherein each of the rows of rollers comprises two or more rollers.

2. The windshield setting system of claim 1, wherein the two rows of rollers are substantially perpendicular to each other.

3. The windshield setting system of claim 2, further comprising a slide plate that may be slidably adjusted and secured to the base plate and secured to the convex deck plate to adjust a location of the deck plate relative to the windshield installation point.

4. The windshield setting system of claim 1, further comprising a slide plate that may be slidably adjusted and secured to the base plate and secured to the convex deck plate to adjust a location of the deck plate relative to the windshield installation point.

5. The windshield setting system of claim 1, wherein the two parallel rows of rollers comprise a first row of two or more rollers and a second row of rollers, wherein the rollers of the first row each have a single axis of rotation transverse to the channel and parallel to the other rollers of the first row, and wherein the rollers of the second row each have a single axis of rotation transverse to the channel and parallel to the other rollers of the second row.

6. A windshield setting system comprising a platform removably affixed to a windshield wiper blade post and two partially overlapping lines of rollers perpendicular to each other positioned above a convex top of the platform; wherein the two lines of rollers form a groove between them capable of supporting an automobile windshield such that a bottom edge of the windshield may be slid through the groove between the two lines of rollers; wherein the two lines of rollers overlap along a length of the groove so that the windshield is not capable of coming into to contact with the platform when positioned in the groove; and, wherein the rollers have axes of rotation perpendicular to the groove and are not capable of rotation in a direction transverse to the groove.

7. The windshield setting system of claim 6, wherein the platform is removably affixed to the wiper blade post by inserting the post through an aperture in the platform and affixing a nut onto the post.

8. The windshield setting system of claim 7, wherein the platform comprises a base plate affixed to the wiper blade post and a convex deck plate supporting the two lines of rollers, wherein the convex deck plate is removably affixed to the base plate.

9. The windshield setting system of claim 8, wherein the deck plate further comprises a slide plate providing sliding adjustment of a position of the two lines of rollers on the deck plate relative to the wiper post.

10. The windshield setting system of claim 9, wherein the slide plate includes two alignment channels configured to slidingly engage two screws extending from the base plate, wherein a position of the slide plate may be secured by tightening the two screws of the base plate.

11. The windshield setting system of claim 10, wherein the two alignment channels are perpendicular to a direction of the groove formed by the two lines of rollers.

12. The windshield setting system of claim 10, wherein the slide plate comprises a plurality of interchangeable slide plates removably attachable to the deck plate.

13. A method for supporting a windshield on an automobile comprising:

providing a solid platform having an aperture through which a windshield wiper post may extend through, the platform having a convex top, the convex top having two lines of rollers offset from one another, arranged perpendicularly to one another and forming a groove between the lines of rollers and above the convex top, and wherein the two lines of rollers partially overlap within the groove along a length of the groove;

removing a windshield wiper from a post to which it is mounted on an automobile;

placing the platform over the wiper post such that the post extends through the aperture of the platform;

securing the platform about the wiper post by screwing a nut onto the wiper post;

positioning a bottom edge of a windshield in the groove formed by the two lines of rollers.

14. The method of claim 13, wherein the platform comprises a base plate affixed to the wiper blade post and a convex deck plate supporting the two lines of rollers, wherein the convex deck plate is removably affixed to the base plate.

15. The method of claim 14, wherein the deck plate further comprises a slide plate providing sliding adjustment of a position of the two lines of rollers on the deck plate relative to the wiper post.

16. The method of claim 15, wherein the slide plate includes two alignment channels configured to slidingly engage two screws extending from the base plate, wherein a position of the slide plate may be secured by tightening the two screws of the base plate.

17. The method of claim 16, wherein the two alignment channels are perpendicular to a direction of the groove formed by the two lines of rollers.

18. The method of claim 17, wherein the slide plate comprises a plurality of interchangeable slide plates removably attachable to the deck plate.

19. A method of claim 13, wherein all of the rollers each have a single axis of rotation perpendicular to the groove and the rollers are not capable of rotation in a direction transverse to the groove.

* * * * *